United States Patent
Huang et al.

(10) Patent No.: US 7,849,244 B2
(45) Date of Patent: Dec. 7, 2010

(54) APPARATUS FOR RESOLVING CONFLICTS HAPPENED BETWEEN TWO I²C SLAVE DEVICES WITH THE SAME ADDRESSED ADDRESS IN COMPUTER SYSTEM

(75) Inventors: Li-Hong Huang, Shanghai (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 51 days.

(21) Appl. No.: 12/330,812

(22) Filed: Dec. 9, 2008

(65) Prior Publication Data
US 2009/0234999 A1    Sep. 17, 2009

(30) Foreign Application Priority Data
Mar. 12, 2008    (TW) ................ 97108699 A

(51) Int. Cl.
*G06F 13/40* (2006.01)
(52) U.S. Cl. .................... 710/110; 710/316; 710/29
(58) Field of Classification Search ......... 710/104–105, 710/110, 306–317, 29–35
See application file for complete search history.

(56) References Cited

U.S. PATENT DOCUMENTS

| | | | | |
|---|---|---|---|---|
| 6,233,635 | B1 * | 5/2001 | Son ........................ | 710/315 |
| 6,792,478 | B2 * | 9/2004 | Munguia et al. ............... | 710/9 |
| 6,990,549 | B2 * | 1/2006 | Main et al. .................. | 710/306 |
| 7,016,981 | B2 * | 3/2006 | Ervin ........................ | 710/1 |
| 7,085,863 | B2 * | 8/2006 | Barenys et al. .............. | 710/104 |
| 7,650,450 | B2 * | 1/2010 | Soriano et al. .............. | 710/110 |
| 2003/0212847 | A1 * | 11/2003 | Bandholz et al. ............ | 710/305 |
| 2007/0162671 | A1 * | 7/2007 | Seo ............................ | 710/110 |
| 2008/0091788 | A1 * | 4/2008 | Feng .......................... | 709/208 |

* cited by examiner

*Primary Examiner*—Raymond N Phan
(74) *Attorney, Agent, or Firm*—J.C. Patents

(57) ABSTRACT

An apparatus for resolving conflicts happened between two I2C slave devices with the same addressed address is provided. The apparatus is composed by all cheap electronic devices, so as to achieve a purpose of lowering a cost for design. In addition, in the apparatus for resolving conflicts happened between two I2C slave devices with the same addressed address of the invention, all the I²C slave devices are addressed by an I²C master device to perform the data transmission subsequently before a basic input/output system (BIOS) completes a power-on self-test (POST), but all the I²C slave devices are addressed by a system chip (for example, a baseboard management controller (BMC)) to perform the data transmission subsequently after the BIOS completes the POST. Therefore, the purpose of performing the data transmission for all the I²C slave devices on real time is achieved.

17 Claims, 4 Drawing Sheets

APPARATUS FOR RESOLVING CONFLICTS HAPPENED BETWEEN TWO I²C SLAVE DEVICES WITH THE SAME ADDRESSED ADDRESS IN COMPUTER SYSTEM

CROSS-REFERENCE TO RELATED APPLICATION

This application claims the priority benefit of Taiwan application Ser. No. 97108699, filed on Mar. 12, 2008. The entirety of the above-mentioned patent application is hereby incorporated by reference herein and made a part of specification.

BACKGROUND OF THE INVENTION

1. Field of the Invention

The present invention generally relates to a data transmission system, in particular, to an apparatus for resolving conflicts happened between two I²C slave devices with the same addressed address.

2. Description of Related Art

An inter-integrated circuit (I²C) bus is a conventional industrial standard serial bus and applied to a current computer system, for serving as a connection and a data transmission medium between a plurality of integrated circuits or chips of the computer system. Generally, when a plurality of I²C integrated circuits or I²C chips intends to perform the data transmission by using an I²C bus, one of the plurality of I²C integrated circuits or I²C chips must be an I²C master device, for example, a south bridge chip, and the rest are I²C slave devices of the I²C master device.

Accordingly, only the addressed I²C slave devices may perform the data transmission with the I²C master device through the I²C bus. It is well-known that the I²C bus usually includes one serial data (SDA) signal line and one serial clock (SCL) signal line, in which the SDA signal line is usually used to transmit signals such as starting, address, data, controlling, ensuring, and stopping, and the SCL signal line is used to transmit a clock. It should be understood that the technique is known by those skilled in the art, and is not repeated here.

Here, it should be noted that a disadvantage of the data transmission performed by using the I²C bus in the conventional art is that when the plurality of I²C slave devices has the same addressed address, that is, at least two I²C slave devices are addressed at the same time, the I²C master device cannot accurately perform the data transmission with the I²C slave devices with the same addressed address.

In order to effectively resolve the problem, in the conventional art, it is proposed that the time, when the I²C slave devices with the same addressed address are addressed by the I²C master device, is separated by using a buffer, and thus only one addressed I²C slave device exists at a time, so as to resolve the disadvantage resulting from the data transmission by using the I²C bus in the conventional art. However, a resulted disadvantage is that the cost for design is increased.

In addition, it should be further noted that some I²C slave devices must be addressed by the I²C master device only before a basic input/output system (BIOS) completes a power-on self-test (POST), so as to perform the data transmission subsequently, but all the I²C slave devices are not addressed by the I²C master device after the BIOS completes the POST. Therefore, the I²C master device cannot perform the data transmission with all the I²C slave devices on real time.

SUMMARY OF THE INVENTION

Accordingly, the present invention is directed to an apparatus for resolving conflicts happened between two I²C slave devices with the same addressed address, which is composed by cheap electronic devices to achieve a purpose of lowering the cost for design.

In addition, in the apparatus for resolving the conflicts happened between the two I2C slave devices with the same addressed address of the present invention, all the I²C slave devices are addressed by an I²C master device to perform the data transmission subsequently before a BIOS completes a POST, but all the I²C slave devices are addressed by another system chip (for example, a baseboard management controller (BMC)) to perform the data transmission subsequently after the BIOS completes the POST. Therefore, the purpose of performing the data transmission for all the I²C slave devices on real time is achieved.

As embodied and broadly described herein, the present invention provides an apparatus for resolving conflicts happened between two I²C slave devices with the same addressed address, which includes a switching circuit and a selecting circuit. The switching circuit is coupled to the two I²C slave devices, for determining which one of the two I²C slave devices performs the data transmission with an I²C master device according to a first selecting signal and a second selecting signal, when the I²C master device intends to perform the data transmission with the two I²C slave devices. The selecting circuit is coupled to the switching circuit, and controlled by one of the I²C master device and a system chip according to whether a BIOS completes a POST or not, thereby generating the first selecting signal and the second selecting signal.

In an embodiment of the present invention, when the BIOS does not complete the POST, the selecting circuit is controlled by the I²C master device, and when the BIOS completes the POST, the selecting circuit is controlled by the system chip.

In an embodiment of the present invention, the switching circuit includes a first transmission element, a second transmission element, a first N-channel metal oxide semiconductor (NMOS) transistor, and a second NMOS transistor. The first transmission element has one end coupled to the I²C master device through an SCL signal line of an I²C bus, and the other end coupled to one of the two I²C slave devices. The second transmission element has one end coupled to the I²C master device through the SCL signal line, and the other end coupled to the other one of the two I²C slave devices.

The first NMOS transistor has a gate for receiving the first selecting signal, a source coupled to the I²C master device through an SDA signal line of the I²C bus, and a drain coupled to the I²C slave device that is coupled to the other end of the first transmission element. The second NMOS transistor has a gate for receiving the second selecting signal, a source coupled to the I²C master device through the SDA signal line, and a drain coupled to the I²C slave device that is coupled to the other end of the second transmission element.

In an embodiment of the present invention, the other end of the first transmission element, the other end of the second transmission element, the drain of the first NMOS transistor, and the drain of the second NMOS transistor are further respectively coupled to a first system voltage through a pull-up resistor. In addition, the first transmission element and the second transmission element are one of conducting wires and 0 Ω resistors.

In an embodiment of the present invention, the selecting circuit includes a first negative-positive-negative (NPN) transistor, a second NPN transistor, and a third NPN transistor. The first NPN transistor has a base for receiving a state signal output by a state pin of the I²C master device, an emitter coupled to a general input/output pin of the I²C master device, and a collector for generating the first selecting signal and coupled to a second system power source.

The second NPN transistor has a base for receiving a transfer signal, an emitter coupled to a general input/output pin of the system chip, and a collector coupled to the collector of the first NPN transistor. The third NPN transistor has a base coupled to the collector of the second NPN transistor, an emitter coupled to a ground potential, and a collector for generating the second selecting signal and coupled to the second system power source. The I²C master device obtains whether the BIOS completes the POST or not through the state signal, and the transfer signal and the state signal are inverted with each other.

In an embodiment of the present invention, when the BIOS does not complete the POST, the state signal is in a high voltage, and the transfer signal is in a low voltage, such that the first NPN transistor is turned on, and the second NPN transistor is turned off. In this manner, when the general input/output pin of the I²C master device outputs the high voltage, the first selecting signal is in the high voltage, and the second selecting signal is in the low voltage, and when the general input/output pin of the I²C master device outputs the low voltage, the first selecting signal is in the low voltage, and the second selecting signal is in the high voltage.

In an embodiment of the present invention, when the general input/output pin of the I²C master device outputs the high voltage, the I²C master device performs the data transmission with the I²C slave device coupled to the other end of the first transmission element. When the general input/output pin of the I²C master device outputs the low voltage, the I²C master device performs the data transmission with the I²C slave device coupled to the other end of the second transmission element.

In an embodiment of the present invention, when the BIOS completes the POST, the state signal is in a low voltage, and the transfer signal is in a high voltage, such that the first NPN transistor is turned off, and the second NPN transistor is turned on. In this manner, when the general input/output pin of the system chip outputs the high voltage, the first selecting signal is in the high voltage, and the second selecting signal is in the low voltage, and when the general input/output pin of the system chip outputs the low voltage, the first selecting signal is in the low voltage, and the second selecting signal is in the high voltage.

In an embodiment of the present invention, when the general input/output pin of the system chip outputs the high voltage, the I²C master device performs the data transmission with the I²C slave device coupled to the other end of the first transmission element. When the general input/output pin of the system chip outputs the low voltage, the I²C master device performs the data transmission with the I²C slave device coupled to the other end of the second transmission element.

In an embodiment of the present invention, the apparatus for resolving the conflicts happened between the two I²C slave devices with the same addressed address further includes a transfer circuit, which is coupled to the I²C master device and the selecting circuit, for inverting the state signal and generating the transfer signal accordingly.

In an embodiment of the present invention, the transfer circuit includes a fourth NPN transistor, which has a base for receiving the state signal, an emitter coupled to the ground potential, and a collector for generating the transfer signal and coupled to at least one of the first system voltage and the second system voltage.

In an embodiment of the present invention, the transfer circuit further includes a first resistor and a second resistor. The first resistor is coupled between the state pin and the base of the fourth NPN transistor, and the second resistor is coupled between the collector of the fourth NPN transistor and the first system voltage or the second system voltage coupled to the collector of the fourth NPN transistor.

In an embodiment of the present invention, the selecting circuit further includes a first resistor, a second resistor, a third resistor, a fourth resistor, and a fifth resistor. The first resistor is coupled between the state pin and the base of the first NPN transistor. The second resistor is coupled between the base of the second NPN transistor and the collector of the fourth NPN transistor. The third resistor is coupled between the collector of the first NPN transistor and the second system power source. The fourth resistor is coupled between the collector of the first NPN transistor and the base of the third NPN transistor. The fifth resistor is coupled between the collector of the third NPN transistor and the second system power source.

In an embodiment of the present invention, the I²C master device is a south bridge chip, and the system chip is a baseboard management controller (BMC).

The apparatus for resolving the conflicts happened between the two I²C slave devices with the same addressed address of the present invention is composed by cheap electronic devices, so as to achieve the purpose of lowering a cost for design. In addition, in the apparatus for resolving the conflicts happened between the two I2C slave devices with the same addressed address of the present invention, all the I²C slave devices are addressed by the I²C master device to perform the data transmission subsequently before the BIOS completes the POST, but all the I²C slave devices are addressed by another system chip (for example, a BMC) to perform the data transmission subsequently after the BIOS completes the POST. Therefore, the purpose of performing the data transmission for all the I²C slave devices on real time is achieved.

In order to have a further understanding of above features and advantages of the present invention, a detailed description is given below with embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
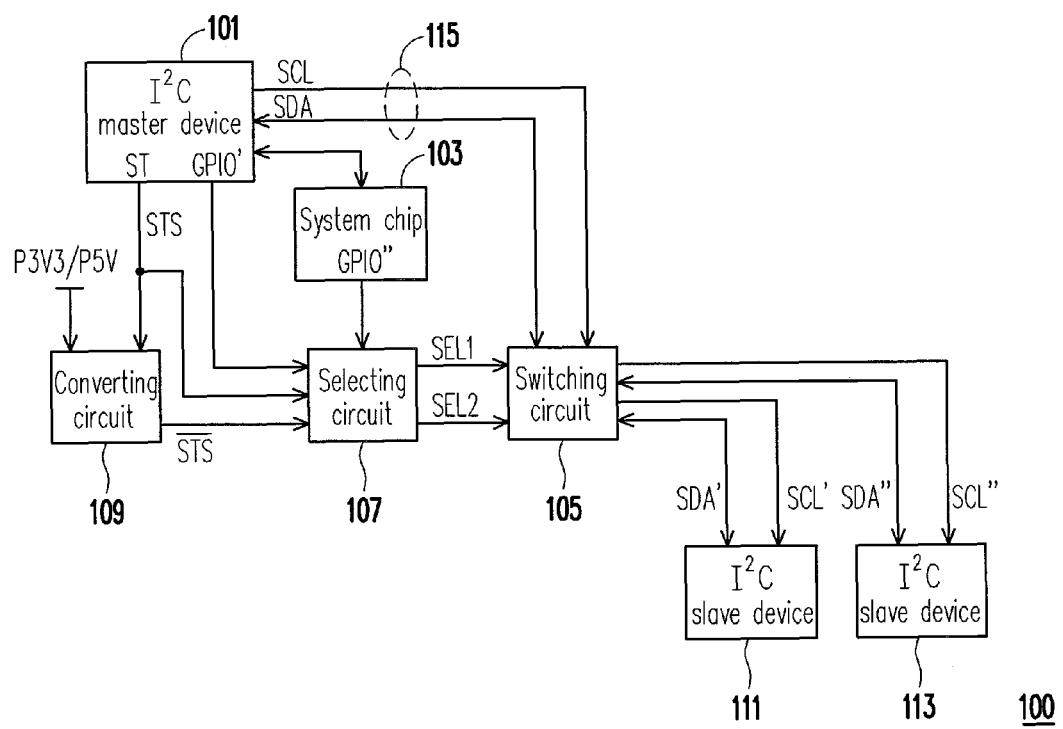
FIG. 1 is an architectural view of a computer system of an apparatus for resolving conflicts happened between two I²C slave devices with the same addressed address according to the present invention.

Reference will now be made in detail to the present embodiments of the invention, examples of which are illustrated in the accompanying drawings. Wherever possible, the same reference numbers are used in the drawings and the description to refer to the same or like parts.

The technical efficacy of the present invention is to achieve purposes of lowering a cost for design and performing the data transmission for all I²C slave devices on real time. In the following, technical features of the present invention are further described in detail, for providing a reference for those of ordinary skill in the art of the present invention.

FIG. 1 is an architectural view of a computer system 100 of an apparatus for resolving conflicts happened between two I²C slave devices with the same addressed address according to the present invention. Referring to FIG. 1, the computer system 100 includes a I²C master device (for example, a south bridge chip) 101, a system chip (for example, a BMC) 103, a switching circuit 105, a selecting circuit 107, a converting circuit 109, and two I²C slave devices 111 and 113. The I²C slave devices 111 and 113 has the same addressed address, and the apparatus for resolving the conflicts happened between the two I²C slave devices with the same addressed address of the present invention is mainly composed of the switching circuit 105, the selecting circuit 107, and the converting circuit 109.

The switching circuit 105 is coupled to the I²C slave devices 111 and 113, for determining which one of the two I²C slave devices 111 and 113 performs a data transmission with the I²C master device 101 according to a first selecting signal SEL1 and a second selecting signal SEL2, when the I²C master device 101 intends to perform the data transmission with the two I²C slave devices 111 and 113.

The selecting circuit 107 is coupled to the switching circuit 105, and is controlled by one of the I²C master device 101 and the system chip 103 according to whether a basic input output system (BIOS) (not shown) completes a power-on self-test (POST) or not, thereby generating the first selecting signal SEL1 and the second selecting signal SEL2. In this embodiment, when the BIOS does not complete the POST, the selecting circuit 107 is controlled by the I²C master device 101, that is, the south bridge chip, and when the BIOS completes the POST, the selecting circuit 107 is controlled by the system chip 103, that is, the BMC.

The transfer circuit 109 is coupled to the I²C master device 101 and the selecting circuit 107, for inverting a state signal STS generated by a state pin ST of the I²C master device 101 and generating a transfer signal /STS. The I²C master device 101 may obtain whether the BIOS completes the POST or not through the state signal STS, and the transfer signal /STS and the state signal STS are inverted with each other.

For the reason why the apparatus for resolving the conflicts happened between the two I²C slave devices with the same addressed address of the present invention may achieve the purposes of lowering the cost for design and performing the data transmission for all I²C slave devices on real time, in the following, an explanation is given with several accompanying drawings, such that those skilled in the art of the present invention may easily understand the spirit of the present invention.

Figure 2:
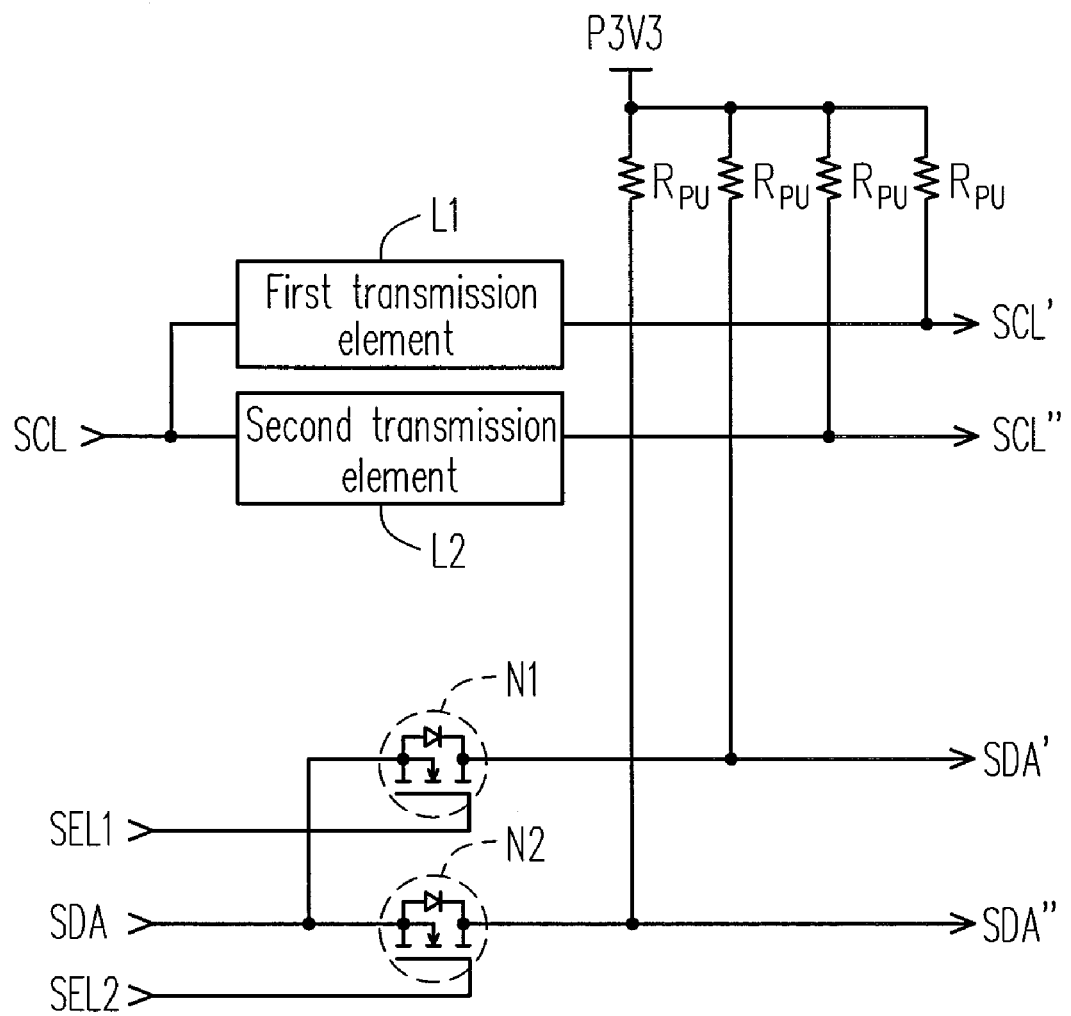
FIG. 2 is internal circuit diagram of a switching circuit of FIG. 1.

FIG. 2 is internal circuit diagram of the switching circuit 105 of FIG. 1. Referring to FIGS. 1 and 2, the switching circuit 105 includes a first transmission element L1, a second transmission element L2, a first NMOS transistor N1, and a second NMOS transistor N2. The first transmission element L1 has one end coupled to the I²C master device 101 through an SCL signal line SCL of the I²C bus 115, and the other end coupled to the I²C slave device 111. The second transmission element L2 has one end coupled to the I²C master device 101 through the SCL signal line SCL, and the other end coupled to the I²C slave device 113.

The first NMOS transistor N1 has a gate for receiving the first selecting signal SEL1, a source coupled to the I²C master device 101 through a serial data (SDA) signal line SDA of the I²C bus 115, and a drain coupled to the I²C slave device 111. The second NMOS transistor N2 has a gate for receiving the second selecting signal SEL2, a source coupled to the I²C master device 101 through the SDA signal line SDA, and a drain coupled to the I²C slave device 113.

The SDA signal line SDA is usually used to transmit signals such as starting, address, data, controlling, ensuring, and stopping signals, and the SCL signal line SCL is used to transmit a clock. However, this technique is well-known by those skilled in the art, and is not repeated here.

In this embodiment, the other end of the first transmission element L1, the other end of the second transmission element L2, the drain of the first NMOS transistor N1, and the drain of the second NMOS transistor N2 are further respectively coupled to a first system voltage P3V3, that is, a 3.3 V system power source of the computer system 100, through a pull-up resistor $R_{PU}$. Further, the first transmission element L1 and the second transmission element L2 may be, but not limited to, common transmission conducting wires, or 0 Ω resistors.

Figure 3:
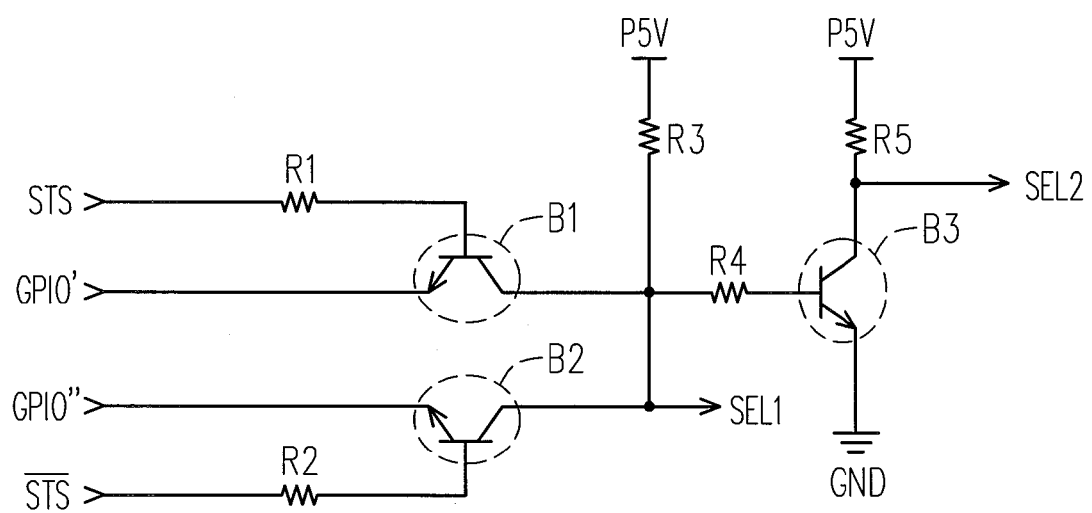
FIG. 3 is internal circuit diagram of a selecting circuit of FIG. 1.

FIG. 3 is internal circuit diagram of the selecting circuit 107 of FIG. 1. Referring to FIGS. 1-3, the selecting circuit 107 includes a first NPN transistor B1, a second NPN transistor B2, a third NPN transistor B3, and first to fifth resistors R1-R5. A base of the first NPN transistor B1 receives the state signal STS output by the state pin ST of the I²C master device 101 through the first resistor R1, an emitter of the first NPN transistor B1 is coupled to a general input/output pin GPIO' of the I²C master device 101 (that is, the south bridge chip), and a collector of the first NPN transistor B1 is used for generating the first selecting signal SEL1 and is coupled to a second system power source P5V, that is, a 5 V system power source of the computer system 100, through the third resistor R3.

A base of the second NPN transistor B2 receives the transfer signal /STS through the second resistor R2, an emitter of the second NPN transistor B2 is coupled to a general input/output pin GPIO" of the system chip 103 (that is, the BMC), and a collector of the second NPN transistor B2 is coupled to the collector of the first NPN transistor B1. A base of the third NPN transistor B3 is coupled to the collector of the second NPN transistor B2 through the fourth resistor R4, an emitter of the third NPN transistor B3 is coupled to a ground potential GND (that is, 0 V), and a collector of the third NPN transistor B3 is used for generating the second selecting signal SEL2 and is coupled to the second system power source P5V through the fifth resistor R5.

Figure 4:
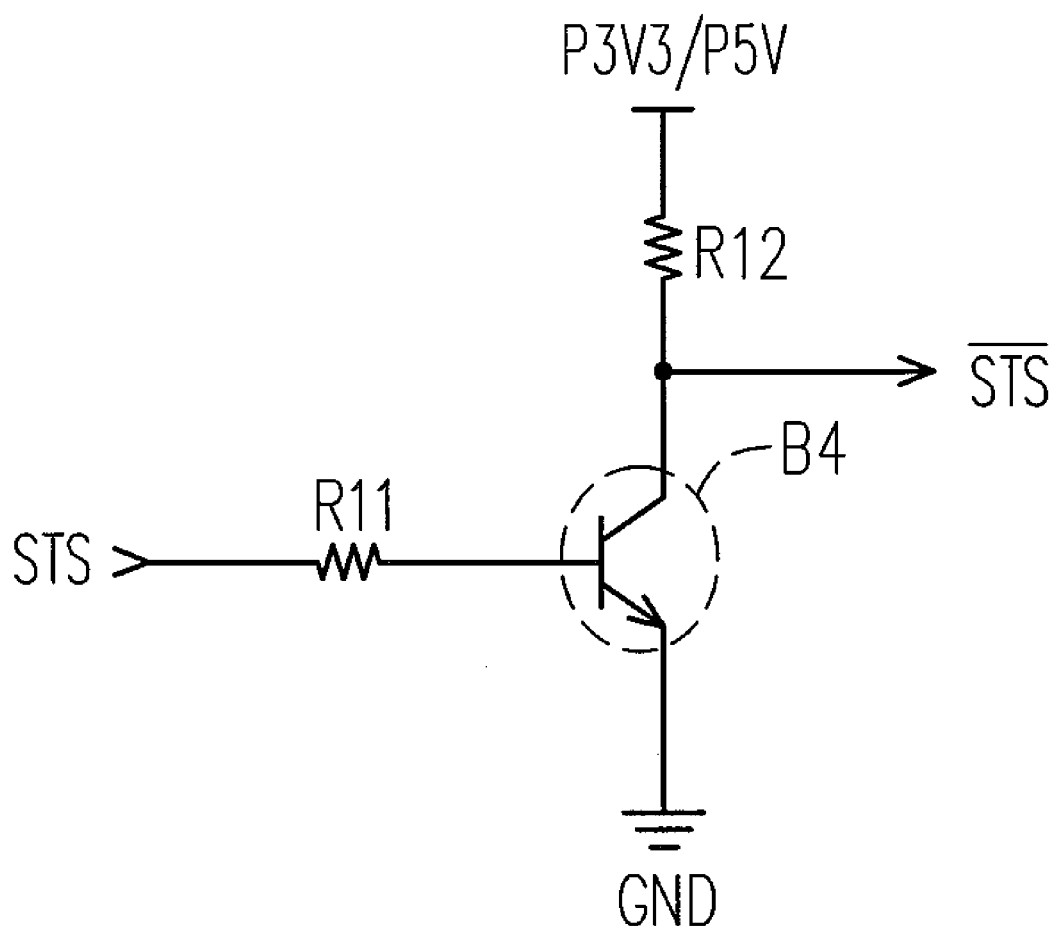
FIG. 4 is internal circuit diagram of a converting circuit of FIG. 1.

FIG. 4 is internal circuit diagram of the converting circuit 109 of FIG. 1. Referring to FIGS. 1-4, the converting circuit 109 includes a fourth NPN transistor B4, and resistors R11 and R12. A base of the fourth NPN transistor B4 receives the state signal STS through the resistor R11, an emitter of the fourth NPN transistor B4 is coupled to the ground potential GND, the a collector of the fourth NPN transistor B4 is used for generating the transfer signal /STS and is coupled to the first system voltage P3V3 or the second system voltage P5V through the resistor R12.

Accordingly, when the BIOS does not complete the POST, the state signal STS is usually in a high voltage, so here the fourth NPN transistor B4 is turned on, and the transfer signal /STS is in a low voltage, so the first NPN transistor B1 is turned on, and the second NPN transistor B2 is turned off. In this manner, when the general input/output pin GPIO' of the I²C master device 101 outputs the high voltage, the first selecting signal SEL1 is in the high voltage, and the third NPN transistor B3 is turned on, so the second selecting signal SEL2 is in the low voltage. Therefore, under this condition, the first NMOS transistor N1 is turned on, and the second NMOS transistor N2 is turned off, such that the I²C master device 101 addresses the I²C slave device 111 to perform the data transmission.

Similarly, when the BIOS does not complete the POST, the state signal STS is in the high voltage, and the transfer signal /STS is in the low voltage, such that the first NPN transistor B1 is turned on, and the second NPN transistor B2 is turned off. In this manner, when the general input/output pin GPIO' of the I²C master device 101 outputs the low voltage, the first selecting signal SEL1 is in the low voltage, and the third NPN transistor B3 is not turned on, so the second selecting signal SEL2 is pulled to the high voltage under the affect of the fifth resistor R5. Therefore, under the condition, the first NMOS transistor N1 is turned off, and the second NMOS transistor N2 is turned on, such that the I²C master device 101 addresses the I²C slave device 113 to perform the data transmit.

Here, it may be known that when the BIOS does not complete the POST, in the apparatus for resolving the conflicts happened between the two I²C slave devices with the same addressed address of the present invention, the I²C slave devices 111 and 113 are addressed by the general input/output pin GPIO' of the I²C master device 101 (that is, the south bridge chip), such that only the addressed I²C slave device 111 or 113 may perform the data transmission with the I²C master device 101.

However, when the BIOS completes the POST, the state signal STS is converted from the high voltage to the low voltage, and the transfer signal /STS is converted from the low voltage to the high voltage, such that the first NPN transistor B1 is turned off, and the second NPN transistor B2 is turned on. In this manner, when the general input/output pin GPIO" of the system chip 103 outputs the high voltage, the first selecting signal SEL1 is in the high voltage, and here the third NPN transistor B3 is turned on, so the second selecting signal SEL2 is in the low voltage. Therefore, under this condition, the first NMOS transistor N1 is turned on, and the second NMOS transistor N2 is turned off, such that the I²C master device 101 addresses the I²C slave device 111 to perform the data transmission.

Similarly, when the BIOS completes the POST, here the state signal STS is in the low voltage, and the transfer signal /STS is also in the high voltage, such that the first NPN transistor B1 is turned off, and the second NPN transistor B2 is turned on. In this manner, when the general input/output pin GPIO" of the system chip 103 outputs the low voltage, the first selecting signal SEL1 is in the low voltage, and here the third NPN transistor B3 is not turned on, so the second selecting signal SEL2 is pulled to the high voltage under the affect of the fifth resistor R5. Therefore, under this condition, the first NMOS transistor N1 is turned off, and the second NMOS transistor N2 is turned on, such that the I²C master device 101 addresses the I²C slave device 113 to perform the data transmission.

Here, it may be known that when the BIOS completes the POST, in the apparatus for resolving the conflicts happened between the two I²C slave devices with the same addressed address of the present invention, the I²C slave devices 111 and 113 are addressed by the general input/output pin GPIO" of the system chip 103 (that is, the BMC), such that only the addressed I²C slave device 111 or 113 may perform the data transmission with the I²C master device 101.

To sum up, the apparatus for resolving the conflicts happened between the two I²C slave devices with the same addressed address of the present invention is composed by cheap electronic devices so as to achieve the purpose of lowering the cost for design. In addition, in the apparatus for resolving the conflicts happened between the two I2C slave devices with the same addressed address of the present invention, all the I²C slave devices are addressed by the I²C master device to perform the data transmission subsequently before the BIOS completes the POST, but all the I²C slave devices are addressed by another system chip (for example, the BMC) to perform the data transmission subsequently after the BIOS completes the POST. Therefore, the purpose of performing the data transmission for all the I²C slave devices on real time is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for resolving conflicts happened between two I²C slave devices with the same addressed address, comprising:
    a switching circuit, coupled to the two I²C slave devices, for determining which one of the two I²C slave devices performs a data transmission with an I²C master device according to a first selecting signal and a second selecting signal, when the I²C master device intends to perform the data transmission with the two I²C slave devices; and
    a selecting circuit, coupled to the switching circuit, and controlled by one of the I²C master device and a system chip according to whether a basic input/output system (BIOS) completes a power-on self-test (POST) or not, thereby generating the first selecting signal and the second selecting signal,
    wherein when the BIOS does not complete the POST, the selecting circuit is controlled by the I²C master device, and when the BIOS completes the POST, the selecting circuit is controlled by the system chip.

2. The apparatus for resolving conflicts happened between two I²C slave devices with the same addressed address according to claim 1, wherein the switching circuit comprises:
    a first transmission element, comprising one end coupled to the I²C master device through a serial clock (SCL) signal line of an I²C bus, and the other end coupled to one of the two I²C slave devices;
    a second transmission element, comprising one end coupled to the I²C master device through the SCL signal line, and the other end coupled to the other one of the two I²C slave devices;
    a first N-channel metal oxide semiconductor (NMOS) transistor, comprising a gate for receiving the first selecting signal, a source coupled to the I²C master device through a serial data (SDA) signal line of the I²C bus, and a drain coupled to the I²C slave device that is coupled to the other end of the first transmission element; and
    a second NMOS transistor, comprising a gate for receiving the second selecting signal, a source coupled to the I²C master device through the SDA signal line, and a drain coupled to the I²C slave device that is coupled to the other end of the second transmission element.

3. The apparatus for resolving conflicts happened between two I²C slave devices with the same addressed address according to claim 1, wherein the I²C master device is a south bridge chip, and the system chip is a baseboard management controller (BMC).

4. A computer system with the apparatus for resolving conflicts happened between two I²C slave devices with the same addressed address according to claim 1.

5. The apparatus for resolving conflicts happened between two I²C slave devices with the same addressed address according to claim 2, wherein the other end of the first transmission element, the other end of the second transmission element, the drain of the first NMOS transistor, and the drain of the second NMOS transistor are further respectively coupled to a first system voltage through a pull-up resistor.

6. The apparatus for resolving conflicts happened between two I²C slave devices with the same addressed address according to claim 2, wherein the first transmission element and the second transmission element are one of conducting wires and 0 Ω resistors.

7. The apparatus for resolving conflicts happened between two I²C slave devices with the same addressed address according to claim 5, wherein the selecting circuit comprises:
- a first negative-positive-negative (NPN) transistor, comprising a base for receiving a state signal output by a state pin of the I²C master device, an emitter coupled to a general input/output pin of the I²C master device, and a collector for generating the first selecting signal and coupled to a second system power source;
- a second NPN transistor, comprising a base for receiving a transfer signal, an emitter coupled to a general input/output pin of the system chip, and a collector coupled to the collector of the first NPN transistor; and
- a third NPN transistor, comprising a base coupled to the collector of the second NPN transistor, an emitter coupled to a ground potential, and a collector for generating the second selecting signal and coupled to the second system power source,
- wherein the I²C master device obtains whether the BIOS completes the POST or not through the state signal, and the transfer signal and the state signal are inverted with each other.

8. The apparatus for resolving conflicts happened between two I²C slave devices with the same addressed address according to claim 7, wherein when the BIOS does not complete the POST, the state signal is in a high voltage, and the transfer signal is in a low voltage, such that the first NPN transistor is turned on, and the second NPN transistor is turned off, in this manner, when the general input/output pin of the I²C master device outputs the high voltage, the first selecting signal is in the high voltage, and the second selecting signal is in the low voltage, and when the general input/output pin of the I²C master device outputs the low voltage, the first selecting signal is in the low voltage, and the second selecting signal is in the high voltage.

9. The apparatus for resolving conflicts happened between two I²C slave devices with the same addressed address according to claim 7, wherein when the BIOS completes the POST, the state signal is in a low voltage, and the transfer signal is in a high voltage, such that the first NPN transistor is turned off, and the second NPN transistor is turned on, in this manner, when the general input/output pin of the system chip outputs the high voltage, the first selecting signal is in the high voltage, and the second selecting signal is in the low voltage, and when the general input/output pin of the system chip outputs the low voltage, the first selecting signal is in the low voltage, and the second selecting signal is in the high voltage.

10. The apparatus for resolving conflicts happened between two I²C slave devices with the same addressed address according to claim 7, further comprising a transfer circuit, coupled to the I²C master device and the selecting circuit, for inverting the state signal and generating the transfer signal accordingly.

11. The apparatus for resolving conflicts happened between two I²C slave devices with the same addressed address according to claim 8, wherein when the general input/output pin of the I²C master device outputs the high voltage, the I²C master device performs the data transmission with the I²C slave device coupled to the other end of the first transmission element.

12. The apparatus for resolving conflicts happened between two I²C slave devices with the same addressed address according to claim 8, wherein when the general input/output pin of the I²C master device outputs the low voltage, the I²C master device performs the data transmission with the I²C slave device coupled to the other end of the second transmission element.

13. The apparatus for resolving conflicts happened between two I²C slave devices with the same addressed address according to claim 9, wherein when the general input/output pin of the system chip outputs the high voltage, the I²C master device performs the data transmission with the I²C slave device coupled to the other end of the first transmission element.

14. The apparatus for resolving conflicts happened between two I²C slave devices with the same addressed address according to claim 9, wherein when the general input/output pin of the system chip outputs the low voltage, the I²C master device performs the data transmission with the I²C slave device coupled to the other end of the second transmission element.

15. The apparatus for resolving conflicts happened between two I²C slave devices with the same addressed address according to claim 10, wherein the transfer circuit comprises a fourth NPN transistor, comprising a base for receiving the state signal, an emitter coupled to the ground potential, and a collector for generating the transfer signal and coupled to at least one of the first system voltage and the second system voltage.

16. The apparatus for resolving conflicts happened between two I²C slave devices with the same addressed address according to claim 15, wherein the transfer circuit further comprises:
- a first resistor, coupled between the state pin and the base of the fourth NPN transistor; and
- a second resistor, coupled between the collector of the fourth NPN transistor and the first system voltage or the second system voltage coupled to the collector of the fourth NPN transistor.

17. The apparatus for resolving conflicts happened between two I²C slave devices with the same addressed address according to claim 15, wherein the selecting circuit further comprises:
- a first resistor, coupled between the state pin and the base of the first NPN transistor;
- a second resistor, coupled between the base of the second NPN transistor and the collector of the fourth NPN transistor;
- a third resistor, coupled between the collector of the first NPN transistor and the second system power source;
- a fourth resistor, coupled between the collector of the first NPN transistor and the base of the third NPN transistor; and
- a fifth resistor, coupled between the collector of the third NPN transistor and the second system power source.

* * * * *